United States Patent [19]

Targan

[11] Patent Number: 4,496,605
[45] Date of Patent: Jan. 29, 1985

[54] PROCESS FOR PRODUCING BLACK BARLEY MALT EXTRACT

[76] Inventor: Ronald G. Targan, 80 Main St., West Orange, N.J. 07052

[21] Appl. No.: 533,733

[22] Filed: Sep. 19, 1983

[51] Int. Cl.³ .............................. C12C 1/18; A23L 1/28
[52] U.S. Cl. ..................................... 426/655; 426/436; 426/600
[58] Field of Search ............... 426/600, 655, 508, 507, 426/436, 431, 489

[56] References Cited

U.S. PATENT DOCUMENTS

| 82,909 | 10/1868 | Wesselhoeft | 426/655 |
| 541,300 | 6/1895 | Theurer | 426/655 |
| 2,513,687 | 7/1950 | Strezynski | 426/436 |
| 2,726,957 | 12/1955 | Kunz | 426/436 |

Primary Examiner—Raymond Jones
Assistant Examiner—Marianne S. Minnick

[57] ABSTRACT

Black barley malt extract is produced by crushing fully grown and fully germinated barley malt followed by a series of hulling, heating, agitating, cooling, separating and concentrating procedures.

11 Claims, No Drawings

PROCESS FOR PRODUCING BLACK BARLEY MALT EXTRACT

This invention relates to the production of a barley malt product, and more particularly relates to the production of black or "carmelized" barley malt extract by a novel process resulting in high yields of the extract.

The food, beverage and pharmaceutical manufacturing industries extensively use carmel colorant to impart an amber shade to a wide variety of products including carbonated beverages, medicinal preparations, soups, bakery products, cereals, candies, and numerous other foods. Commercially, carmel colorant has been manufactured by heating sugar, usually in the presence of ammonium salts as a catalytic agent. Such heating process, known as carmelization, causes a myriad of complex chemical reactions to occur, including polymerization, rearrangement and condensation. Unfortunately, however, some of these chemical reactions produce unfavorable results, one of the most serious of which is nitrosamine formation. Nitrosamines are presently believed to be carcinogenic. Accordingly, a suitable alternative to carmelized sugar is highly desirable.

It is well known that the structure, composition and enzyme content of barley can be modified by a process of malting the barley. By malting, enzyme formation occurs and the food reserves are modified to permit hydrolysis during a subsequent mashing operation.

The malting process can be considered as consisting of four main steps: storing, steeping, germinating and kilning.

The storing step in the barley malting process prepares the barley for the subsequent germination step. Freshly harvested barley does not germinate very well. Inhibitors native to the barley kernals provide a natural dormancy to prevent premature germination of the kernal immediately after harvesting. Such premature germination would kill the kernal during the winter. These native inhibitors are destroyed either by aging or by lowering the temperature of the kernals in a manner similar to a winter chill. Usually, storing the barley for about 30 to 90 days is sufficient to impart a good germinating capacity to the barley.

The next step in the barley malting process involves the "steeping" of the barley kernals in water for about 2 to 3 days at a temperature of about 50° to 65° F., until a moisture content of about 35-47% by weight is achieved. This moisture level allows for a uniform germination of the barley kernals. The steeping operation is usually carried out in a large cylindrical tank having a conical bottom with means for vigorous aeration and mixing of the steep mixture.

The steeped barley is next transferred to the germinating rooms. Here the steeped barley is grown under carefully controlled conditions of moisture, aeration, temperature and time. Such conditions are well known and will generally vary from malthouse to malthouse. Growth of the kernal begins at the embryo end and proceeds toward the distal end. The kernal begins to "chill" at the embryo end of the kernal by showing a white tip. Rootlets grow outwardly from the white tip. The acrospire also grows from the embryo end of the kernal and proceeds under the hull toward the distal end. The chemical changes in the barley kernal are basically the result of complex enzymatic activity including oxidation, reduction and proteolysis. When the barley kernal germinates to an acceptable level, which in most instances is a minimum of 95 percent, the barley is ready to function as a malt for the enzymatic conversion of starches to dextrins and sugars, and the enzymatic conversion of insoluble proteins to soluble proteins during subsequent masking operations.

The last step in the malting process is kilning or drying, which halts the germination process at its peak of enzyme development and starch modification. Here the germinated barley kernals are subjected to high air flow and temperatures up to about 190° F. until the moisture of the barley is reduced to about 3.5 to 4%. This drying usually occurs in stages, with the beginning stage operating at lower temperatures ranging from about 120° F. to 140° F., and the final stage operating at an upper temperature of about 190° F.

Malted barley can be processed and used in many ways. The brewing industry has roasted malted barley to make a carmelized or black malted barley. The black malted barley is then added to the brew as a color and flavor modifier.

The food industry often uses a barley malt extract which is made by mashing the malted barley and then concentrating the extract by vacuum evaporation. The mashing operation itself consists of three basic steps: crushing, extracting and solids separation.

The first step of the mashing operation is crushing the malted barley. The kernals are fed to a mill, such as a six-roll malt mill manufactured by Buhler-Miag, Inc., where the malted barley is typically crushed to produce a grist of, for example, 95%+60 mesh and 40%+28 mesh.

The next step in the mashing operation is extraction. Here, the crushed barley malt is mixed with water in a ratio of about 0.3 gallons of water per pound of dry malt at a typical temperature of about 100°-122° F. The water-barley malt mixture is then slowly heated to a temperature of up to about 170° F., after which it is cooled for subsequent solids separation.

In the last step of mashing operation, the undissolved solids are separated from the extract, often called the wort. Separation can be conducted in a lauter tub or in a plate and frame filter press.

When a clear wort has been obtained by sufficient solids separation, the wort can then be concentrated by evaporation to produce a syrup. Evaporation is conducted under vacuum until a syrup containing about 80% dissolved materials is produced.

There is a need in the art for a process to produce a black malt extract of high quality, in high yields, and in an energy efficient manner.

In accordance with the present invention, a process is provided for preparing a black barley malt extract comprising the steps of (a) Crushing a black barley malt having a Lovibond Tintometer reading greater than 400 and a moisture content of from about 1.5 to 2.5 percent by weight, said black barley malt having been made from substantially fully grown and fully germinated barley:

(b) Separating hulls from the crushed black barley malt;

(c) Combining the crushed black barley malt with water in a ratio of from about 4 to 5.5 gallons of water per pound of crushed black barley malt;

(d) Heating the mixture of the crushed black barley malt and water to a temperature of about 120° F.;

(e) Maintaining the temperature of the mixture of crushing black barley malt and water at about 120° F. for about one hour;

(f) Heating the mixture of the crushed black barley malt and water to a temperature of about 200° F. at a rate of about 20 Fahrenheit degrees per hour;

(g) Maintaining the temperature of the mixture of the crushed black barley malt and water at about 200° F. for about 2 hours to produce a black barley malt wort;

(h) Agitating the mixture of the crushed black barley malt and water during steps (e), (f) and (g);

(i) Cooling the black barley malt wort to a temperature of about 180° F.;

(j) Separating undissolved solids from the black barley malt wort; and (k) Concentrating the black barley malt wort to produce a black barley malt extract.

The barley malt used in the process of the present invention must be substantially fully grown and fully germinated barley malt. Green immature barley kernals tend to cause a floc formation in the final product. Hence, only the straw to tan colored barley kernals should be used in the process of this invention. Further, barley kernals which have not been fully germinated also tend to cause floc formation in the final extract. Hence, the barley malt introduced into the process of this invention should preferably be at least about 99.0% germinated, more preferably about 99.5% germinated, and most preferably 99.9% germinated.

The substantially fully grown and fully germinated barley malt is roasted to produce a black barley malt having a Lovibond Tintometer reading greater than about 400 and a moisture content of about 1.5 to 2.5 percent by weight. Preferably, the barley malt should be roasted until a Lovibond Tintometer reading greater than 600 is reached. A Lovibond Tintometer reading greater than about 400 can be achieved by roasting the barley malt in a drum roaster at a temperature of a least 425° F. for about one hour.

Subsequent to roasting, the now black barley malt is crushed in a six-roller malt mill. The crushed black barley malt is fed into a series of sieves which separate out the hulls of the powdered meat of the black barley malt. The sieves are arranged to provide a black barley malt having a +115 mesh. If the black barley malt is crushed too finely, the undissolved solids of the subsequently formed black barley malt wort cannot be separated very effectively.

The crushed black barley malt is combined with water in a ratio of from about 4 to 5.5 gallons of water per pound of crushed black barley malt. Preferably, the water to malt ratio is about 5.0 gallons per pound. As needed, the pH of the resulting mixture should be adjusted to about 6.2 to 6.4.

The mixture of the crushed black barley malt and water is heated to a temperature of about 120° F., where the mixture stews for a time period of about 1 hour. Preferably, the water mixed with the crushed black barley malt is preheated to 120° F. as well. Subsequently, the mixture is heated to a temperature of about 200° F. at a rate of about 20 Fahrenheit degrees per hour. The final temperature of the mixture of black barley malt and water is critical to the production of a high quality black barley malt extract. If the mixture is heated beyond about 200° F., the final extract tends to form a gel. Any gelatinization of the black barley malt extract essentially destroys the very property which makes such an extract so desirable: its ease of handling, pumpimg, pouring, and mixing.

While it is undesirable to go above about 200° F. in heating the black barley malt/water mixture, it is also undesirable to heat the mixture to a temperature much below about 200° F. Such lower temperatures lower the resulting yields of the process.

Throughout the cooking of the black barley malt and the water, the mixture should be agitated to enhance the dissolution properties of the developing wort.

After the black barley malt has been properly cooked in the water, the resulting wort is cooled to a temperature of about 180° F. This can be accomplished, for example, by pumping the wort to a holding tank, which might have cooling coils therein, or which has sufficient capacity for the addition of direct quench water.

In order to get as high a yield as possible, it is preferred that hydrochloric acid be surged into the black barley malt wort, with vigorous agitation, to reduce the pH of the wort to from about 3.0 to 3.1. Other acids, such as sulfuric acid, may also be used. This action causes additional amounts of the undissolved black barley malt to solubilize. Such additional solubilization increases product yields, reduces the burden on the subsequent filtration step, and lowers the energy cost in the evaporation stage where the extract is ultimately produced.

The solids in the black barley malt wort are then separated from the liquid extract. This is preferably conducted in a plate and frame filter press. To enhance the filtration operation, the barley hulls separated from the black barley malt after the crushing operation can be used as a filter aid. The hulls are added to the black barley malt wort and pumped as a slurry to the filter, or a separate slurry of hulls and water can be prepared and fed to the filter to precoat the filter cloth. It is preferred that the hulls be used both as a precoat and in admixture with the wort to increase the rate of filtration.

The black barley malt wort, now having undissolved solids removed therefrom, is concentrated to produce the black barley malt extract. Preferably, prior to the concentration step, the pH of the black barley malt wort is adjusted to from about 4 to 5 to enhance the flavoring property of the final syrup. The black barley malt wort is concentrated by feeding the wort to a double effect evaporator, where water is evaporated from the wort until a syrup is produced. Preferably, water should be evaporated from the wort until an extract containing from about 25 to 30% by weight of water is produced.

The following examples are presented to illustrate the invention and are not deemed to be limits thereof.

EXAMPLE I

A batch of 200 bushels of black barley malt was fed into a six roller malt mill. The black barley malt was prepared from fully grown and fully germinated barley (99.2% germinated) and had a Lovibond Tintometer reading of 550. The mill's feed settings were top roller 45, bottom roller 35, and the grind was adjusted to feed at two bushels per minute to produce a grist of +115 mesh.

2600 gallons of water at 120° F. were added to the crushed black barley malt and the temperature was again adjusted to 120° F. and held for one hour. The mash was agitated during this procedure and the pH was adjusted to 6.3. After one hour at 120° F. the mash was raised to 140°, held for one hour and then raised to 160° F. for the next hour, 180° F. for the following hour and finally to 200° F. When a temperature of 200° F. was reached, the mash was held at this temperature for a period of two hours. During this period continuous agitation was necessary to assure mash temperature and pH.

It then became necessary to cool the wort to 180° F. to achieve efficient separation of the soluble material that constitutes the wort.

In a separate vessel, ½ of the separated black barley malt hulls were added to water at 180° F. and agitated for a period of ½ hour. This mixture was then pumped to the plate and frame filter to precoat the plate. The balance of the black barley malt hulls were conveyed to the mash tun and added just prior to injecting the entire mash through the plate and frame filter. The resulting wort was adjusted to pH of 5.0 prior to filtration. Then the entire wort was concentrated to 70% solids. The resulting yield was about 6.6%.

COMPARATIVE EXAMPLE II

| Results and Conditions of Example I | Variation for Comparison | Results of Variation |
| --- | --- | --- |
| Clear wort | Under 99.0% germination | Turbidity in wort-slight to moderate cloudy wort |
| 6 hours filtration time | Under 99.0% germination | 8-12 hours filtration required |
| 3696# yield (66%) | Under 99.0% germination Crush Black Barley Malt to: | Loss of 11-15% in yield |
| 3696# yield (66%) | Under +115 mesh | Loss of 8-9% yield |
| 3696# yield (66%) | Over +115 mesh | Loss of 6-9% yield |
| 6 hours filtration time | Over +115 mesh | 10 hours filtration required |
| Good mashing | Insufficient water in mash | Trouble mashing |
| 6 hours filtration time | Insufficient water in mash | 8-11 hours filtration required |
| Good evaporation | Excess water in mash | 1-3 hours additional evaporation time required |
| 3696# yield (66%) | Water/malt mix pH under 6.2 | Loss of 10-15% in yield due to reduced soluble material in wort |
| Free flowing syrup | Water/malt mix pH over 6.4 | Final extract tacky and stringy |
| 3696# yield (66%) | Temperature variations | Inefficient run off causing reduced yields of 13-16% |
| Good Black Malt flavor | Temperature variations | Leaching of undesirable substances causing flavor irregularities |

What is claimed is:

1. A process for producing a black barley malt extract comprising the steps of:
    (a) Crushing a black barley malt having a Lovibond Tintometer reading greater than 400 and a moisture content of from about 1.5 to 2.5 percent by weight, said black barley malt having been made from substantially fully grown and fully germinated barley;
    (b) Separating hulls from the crushed black barley malt;
    (c) Combining the crushed black barley malt with water in a ratio of from about 4 to 5.5 gallons of water per pound of crushed black barley malt;
    (d) Heating the mixture of the crushed black barley malt and water to a temperature of about 120° F.;
    (e) Maintaining the temperature of the mixture of crushed black barley malt and water at about 120° F. for about 1 hour;
    (f) Heating the mixture of the crushed black barley malt and water to a temperature of about 200° F. at a rate of about 20 Fahrenheit degrees per hour;
    (g) Maintaining the temperature of the mixture of the crushed black barley malt and water at about 200° F. for about 2 hours to produce a black barley malt wort;
    (h) Agitating the mixture of the crushed black barley malt and water during steps (e), (f) and (g);
    (i) Cooling the black barley malt wort to a temperature of about 180° F.;
    (j) Separating undissolved solids from the black barley malt wort; and
    (k) Concentrating the black barley malt wort to produce a black barley malt extract.

2. A process for producing black barley malt extract comprising the steps of:
    (a) Roasting substantially fully grown and fully germinated barley malt to produce a black barley malt having a Lovibond Tintometer reading greater than about 400 and a moisture content of from about 1.5 to 2.5 percent by weight;
    (b) Crushing the black barley malt;
    (c) Separating hulls from the crushed black barley malt;
    (d) Combining the crushed black barley malt with water in a ratio of from about 4 to 5.5 gallons of water per pound of crushed black barley malt;
    (e) Heating the mixture of the crushed black barley malt and water to a temperature of about 120° F.;
    (f) Maintaining the temperature of the mixture of crushed black barley malt and water at about 120° F. for about 1 hour;
    (g) Heating the mixture of the crushed black barley malt and water to a temperature of about 200° F. at the rate of about 20 Fahrenheit degrees per hour;
    (h) Maintaining the temperature of the mixture of the crushed black barley malt and water at about 200° F. for about 2 hours to produce a black barley malt wort;
    (i) Agitating the mixture of the crushed black barley malt and water during steps (f), (g) and (h);
    (j) Cooling the black barley malt wort to a temperature of about 180° F.;
    (k) Separating undissolved solids from the black barley malt wort; and
    (l) Concentrating the black barley malt wort to produce a black barley malt extract.

3. The process of claim 2 wherein the roasting in step (a) is conducted by heating the malted barley at a temperature of about 425° F. for about one hour.

4. The process of claim 3 wherein the roasting in step (a) is conducted in a drum roaster.

5. The process of claims 1 or 2 wherein the ratio in the step of combining the crushed black barley malt with water is about 5 gallons of water per pound of crushed black barley malt.

6. The process of claims 1 or 2 further comprising the step of rapidly lowering the pH of the black barley malt wort to from about 3 to 3.1 subsequent to the step of cooling the black barley malt wort.

7. The process of claim 6 wherein hydrochloric acid is used in rapidly lowering the pH of the black barley malt wort.

8. The process of claims 1 or 2 wherein the step of separating undissolved solids from the black barley malt wort is conducted by filtration on a plate and frame filter press.

9. The process of claim 8 further comprising the step of mixing the hulls with the black barley malt wort after the step of cooling the black barley malt wort.

10. The process of claims 1 or 2 wherein the concentrating step is conducted by evaporating water from the black barley malt wort to produce a black barley malt extract containing from about 25 to 30% water.

11. A process for producing black barley malt extract comprising the steps of:
(a) Roasting substantially fully grown barley malt, which is at least about 99.0% germinated, at a temperature of about 425° F. for about one hour to produce a black barley malt;
(b) Crushing the black barley malt to a +115 mesh size.
(c) Separating hulls from the crushed black barley malt;
(d) Mixing the crushed black barley malt with water in a ratio of about 5 gallons of water per pound of crushed black barley malt;
(e) Adjusting the mixture of the crushed black barley malt and water to a pH of about 6.2 to about 6.4;
(f) Heating the mixture of the crushed black barley malt and water to a temperature of about 120° F.;
(g) Maintaining the temperature of the mixture of the crushed black barley malt and water at about 120° F. for about 1 hour;
(h) Heating the mixture of the crushed black barley malt and water to a temperature of about 200° F. at a rate of 20 Fahrenheit degrees per hour;
(i) Maintaining the temperature of the mixture of the crushed black barley malt and water at about 200° F. for about 2 hours to produce a black barley malt wort;
(j) Agitating the mixture of the crushed black barley malt and water during steps (f), (g) and (h);
(k) Cooling the black barley malt wort to a temperature of about 180° F.;
(l) Rapidly lowering the pH of the black barley malt wort to from about 3 to 3.1;
(m) Mixing the hulls from (c) with the black barley malt wort;
(n) Filtering undissolved solids from the black barley malt wort using a plate and frame filter press;
(o) Evaporating water from the black barley malt wort until the water content is from about 25 to 30% by weight, whereby a black barley malt extract is produced.

* * * * *